May 3, 1927.

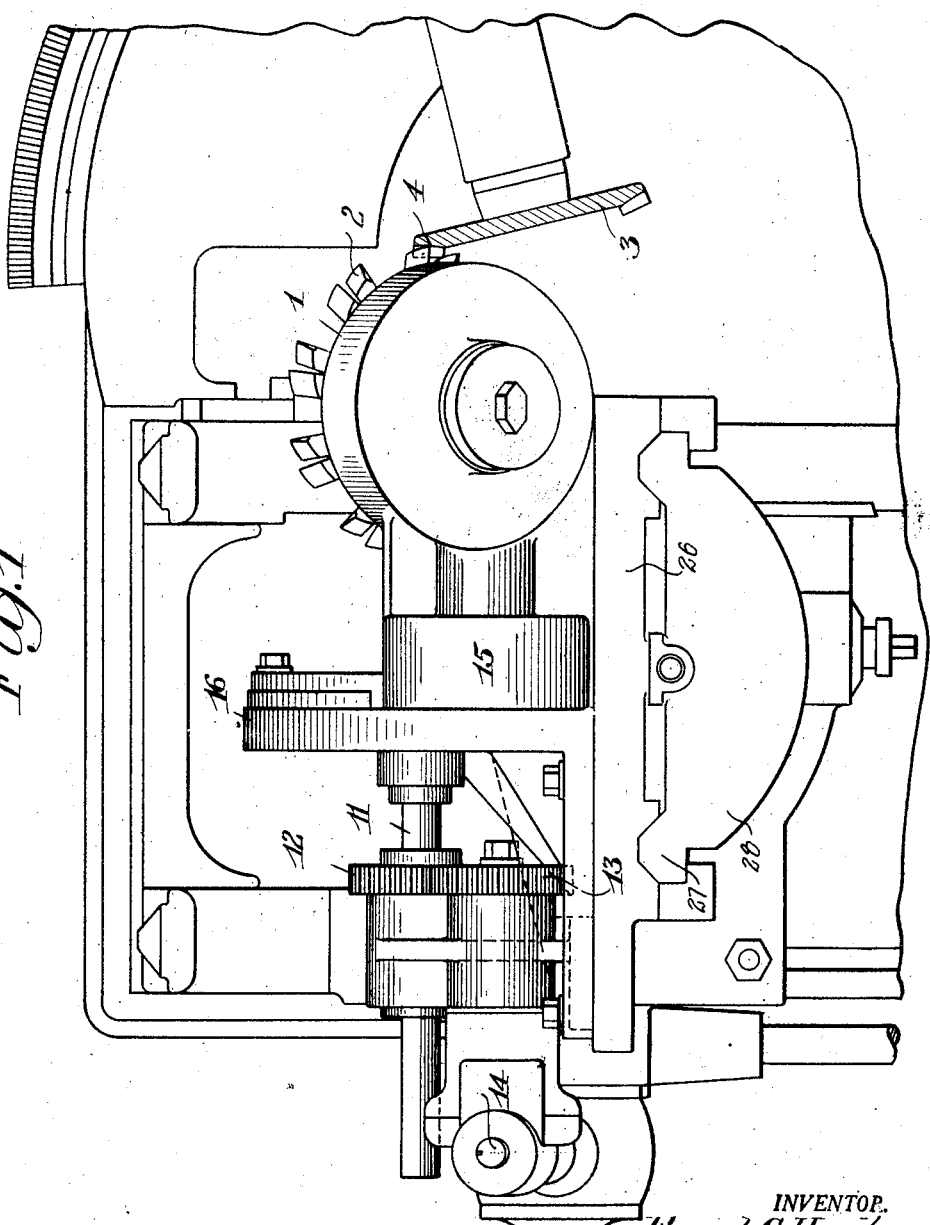

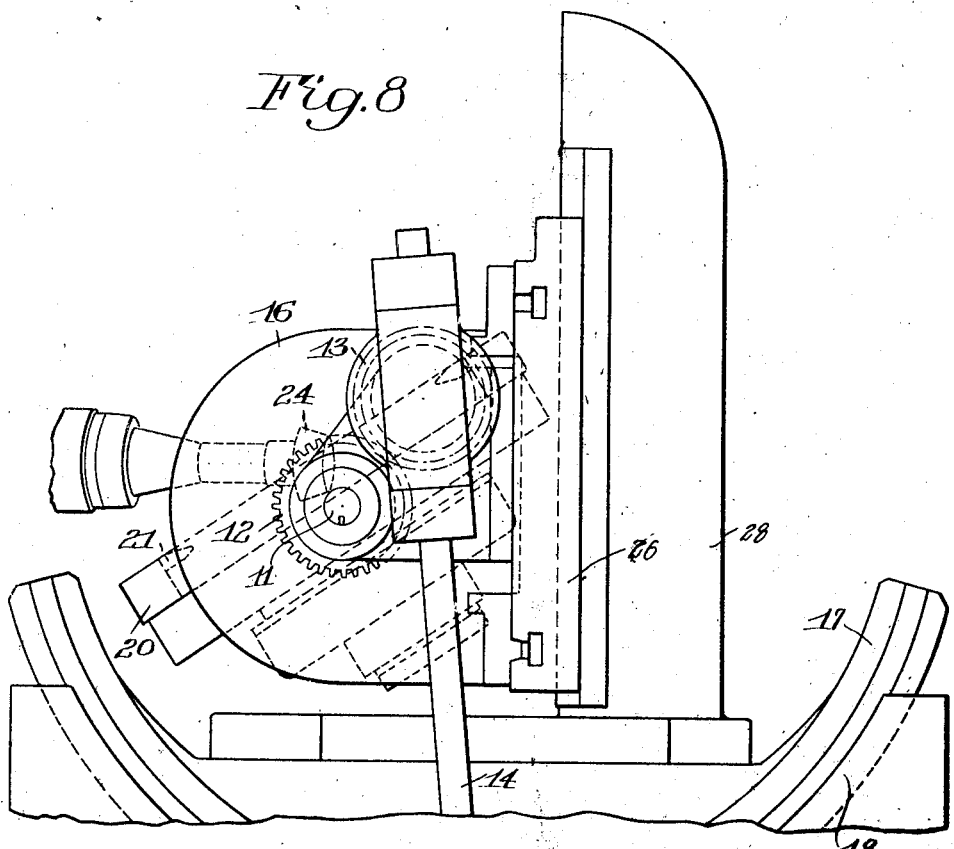
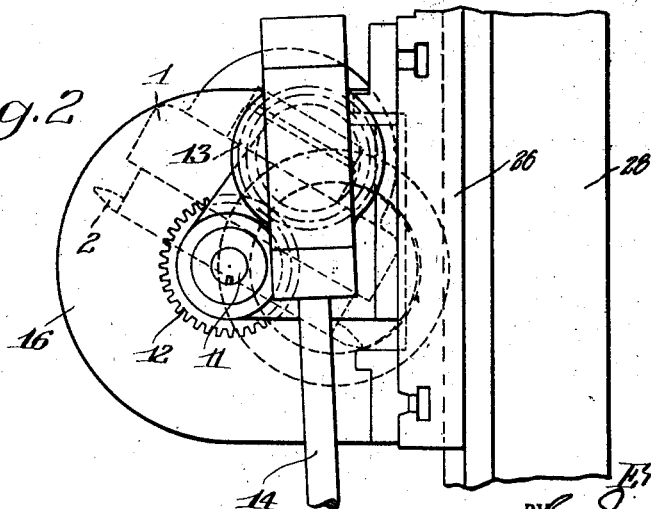

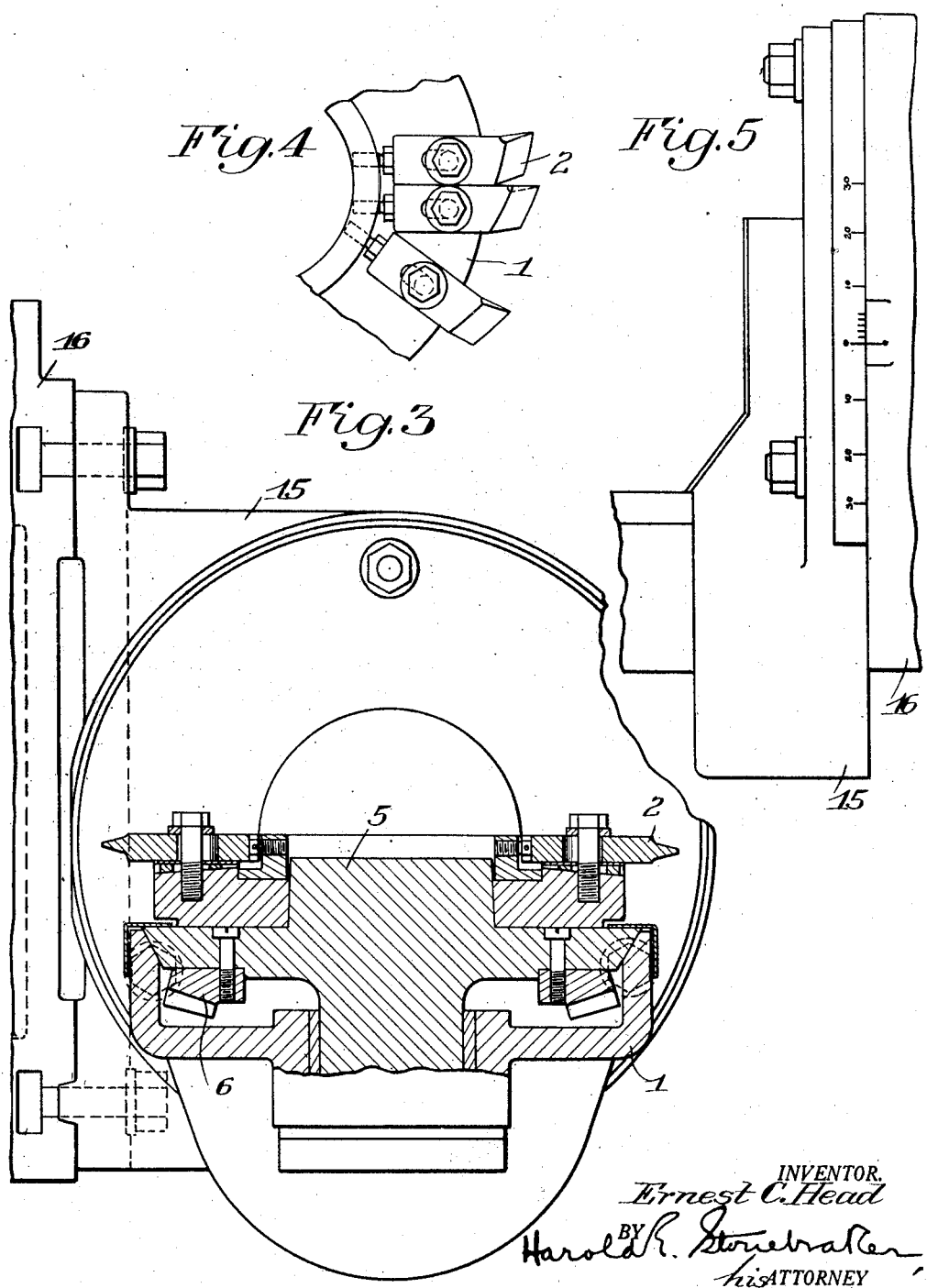

E. C. HEAD 1,626,821

METHOD AND MACHINE FOR CUTTING GEARS

Filed Sept. 12, 1923    5 Sheets-Sheet 4

INVENTOR
Ernest C. Head
BY
ATTORNEY

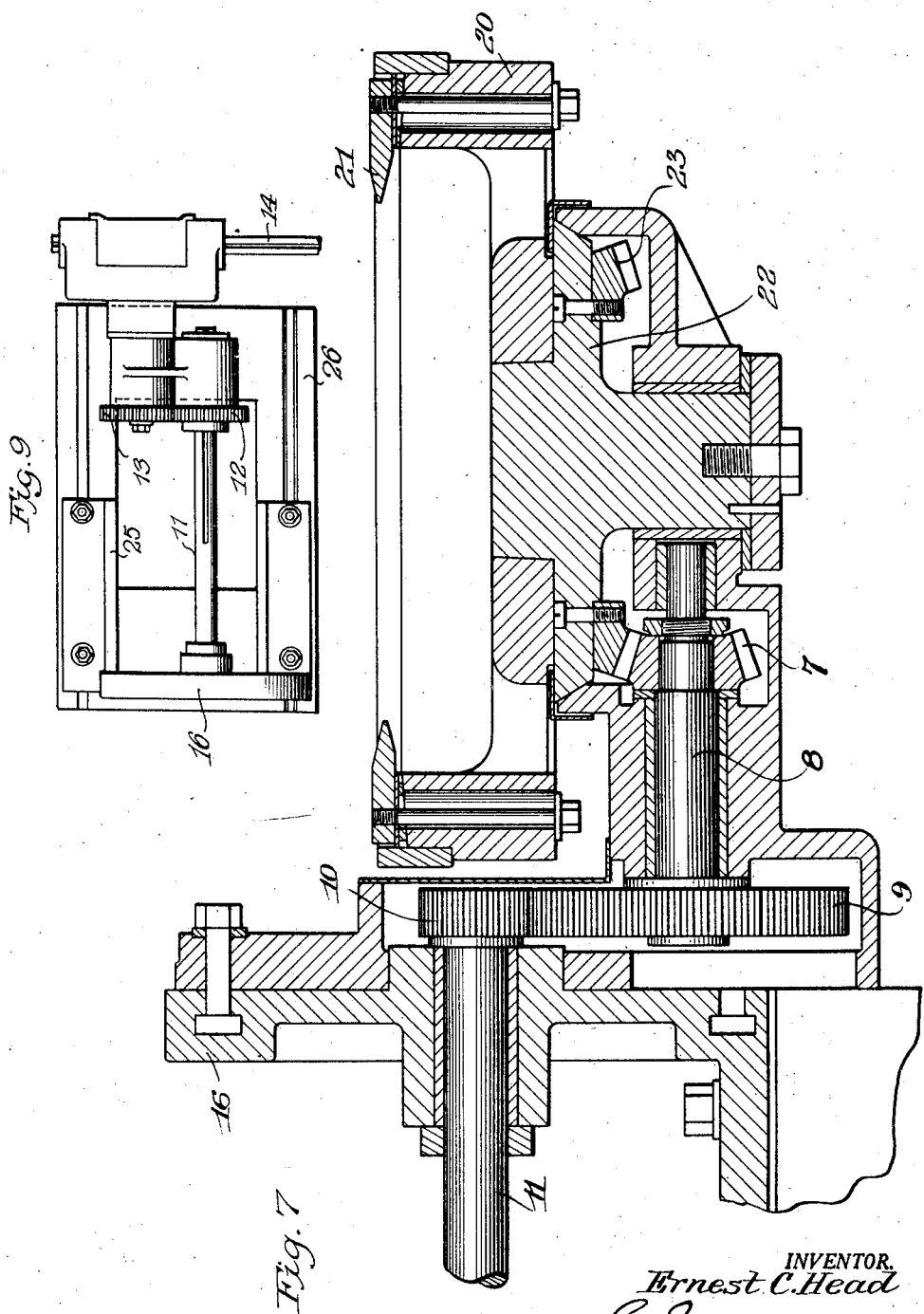

Patented May 3, 1927.

1,626,821

UNITED STATES PATENT OFFICE.

ERNEST C. HEAD, OF ROCHESTER, NEW YORK, ASSIGNOR TO GLEASON WORKS, OF ROCHESTER, NEW YORK, A CORPORATION OF NEW YORK.

METHOD AND MACHINE FOR CUTTING GEARS.

Application filed September 12, 1923. Serial No. 662,274.

This invention relates to a method and apparatus for cutting gears, and has particular reference to hobbing curved tooth or spiral bevel gears such as used in rear axle automobile drives, although it possesses advantages that make it applicable to straight tooth gears and spur gears, as well as other types.

One of the chief objects of the invention is to provide for cutting a gear by the use of a circular edge mill of sufficiently large diameter so that the tools travel entirely across the face of the blank, and forming a mating gear that will mesh accurately with the first gear, without correction of any sort.

More particularly, the invention has for its purpose to produce a pair of gears by means of two circular milling cutters, one having tools extending radially and exteriorly, and the other having tools extending radially and interiorly, so that in one instance, each tool travels in a concave path over the bottom of a tooth space, and in the other instance, in a convex path over the bottom of a tooth space.

A further object of the invention is to provide for hobbing a pair of gears, by continuous rotation of the blanks with two circular milling cutters, as indicated above.

To these and other ends, the invention consists in the various improvements that will appear clearly from the following description when read in conjunction with the accompanying drawings, the novel features being pointed out in the claims following the description.

In the drawings:

Figure 1 is a plan view of a mechanism illustrating one practical embodiment of the invention, and showing a cutter with exteriorly arranged tools for cutting the gear;

Figure 2 is an end view with parts broken away;

Figure 3 is a sectional view of the cutter supporting means;

Figure 4 is a detail elevation of a portion of the cutter, showing the tool arrangement;

Figure 5 is a detail elevation showing the adjustment for the cutter slide;

Figure 7 is a sectional view showing the cutter support and driving mechanism for the cutter illustrated in Figure 6;

Figure 8 is a partial end elevation of the mechanism illustrated in Figures 6 and 7, and Figure 9 is a plan view of the driving mechanism for the pinion cutting tool.

Figure 6:
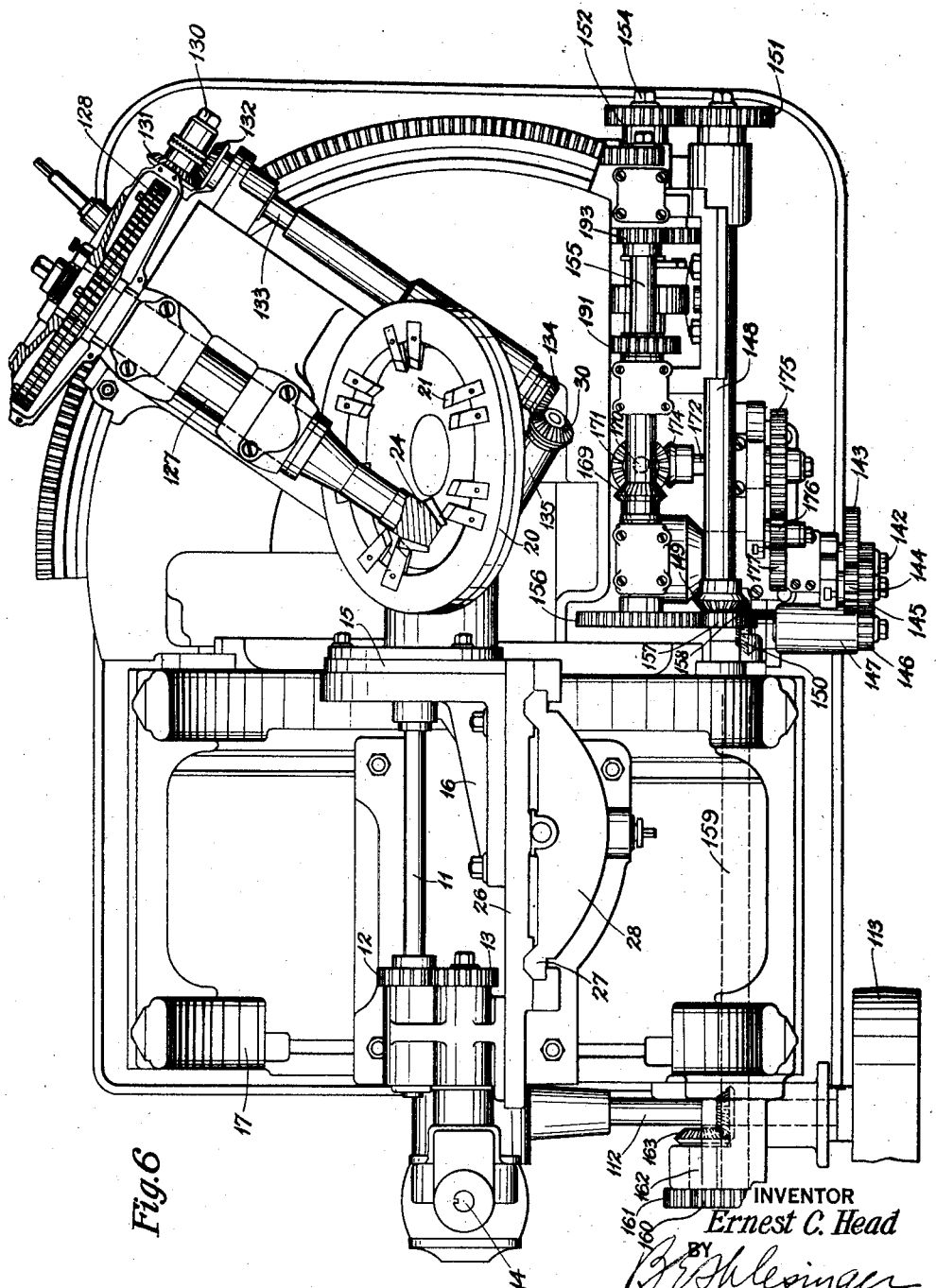
Figure 6 is a plan view showing a machine for cutting a pinion, or the other member of the pair, and including a ring-like cutter with interiorly and radially extending tools.

In the present application, I have disclosed a machine and method for producing a gear pair such as shown and described more fully in my co-pending application filed September 12, 1923, Serial No. 662,273, and while the principle of the invention may be carried out in different ways, and by various mechanisms, for convenience of illustration, I have shown it incorporated in a gear generating machine such as forms the subject matter of Patent No. 1,349,951, dated August 17, 1920.

In the machine of this patent, there is employed a rotary face mill cutter having a series of tools that travel across the blank in a lengthwise curved path, producing a lengthwise curved or spiral tooth. The blank is rotated continuously, and the tools of the cutter engage successively with different teeth, thus giving a hobbing or continuous cutting action. The involute or generated profile of the tooth is obtained by mounting the cutter on an oscillatory cradle and thereby rocking the cutter across the gear blank while rotating the gear blank about its own axis, thus imparting a relative rolling motion to the gear blank and cutter corresponding to the relative movement between a crown gear and segment when one is moved past the other in engagement therewith. The generating motion in the present machine is the same as in the patented structure, and the gearing and various parts for effecting rotation of the gear blank or oscillatory movement of the cutter carrier or cradle are the same.

This invention differs from the patented construction in using a different type of cutter, namely an edge mill instead of a face mill, so that the tools extend radially instead of axially of the cutter, and further in utilizing different forms of cutters for the two members of the gear pair, so that one is complemental to the other. The invention is illustrated as designed for hobbing a spiral bevel gear and pinion, and 1 designates the cutter provided with a series of tools 2 for operation on the gear 3, see Figure 1. The cutter 1 is maintained at a predetermined distance from the apex of the blank depending on the spiral angle of the gear to be produced and the cutter is of sufficiently large diameter with reference to the diameter of the gear so that each tool in its travel passes entirely across the face of the gear in a concave path at the bottom of the tooth space, as indicated at 4.

The cutter 1, see Figure 3, is mounted upon a support 5, which has fixed thereto a bevel gear 6, the latter being driven by a bevel pinion 7, see Figure 7, on shaft 8. The shaft 8 carries a gear 9 engaged and driven by a pinion 10 on shaft 11, the latter carrying a gear 12 which is engaged and operated by a gear 13 from the shaft 14. The cutter and cutter driving mechanism just described is mounted on a support or cradle 17 that is oscillated in curved guideways 18 in the manner disclosed in said previously mentioned patent, and in order to effect proper adjustment of the cutter, the support 5 is mounted in a carrier 15 that is adjustable on a bracket 16. The bracket 16 is secured to the slide 26 which is adjustable on the guideways 27 of the standard 28 which is in turn mounted for horizontal adjustment on the cradle 17, as described in the before mentioned patent.

The gear blank and cutter are rotated continuously, as in said prior patent, to effect a continuous cutting or hobbing action, and also producing a lengthwise curved tooth. In the previously patented construction, each tool travels in a circle with reference to a side face of a tooth, but in the present construction, each tool travels in a straight path with reference to a face of a tooth, and the curvature or spiral lengthwise is produced by the continuous rotation of the blank while they are in engagement and the relative position of the blank and cutter, is being understood that one tool or one pair of tools passes through one tooth space, making a single cut, while the next tool or next pair of tools passes through another tooth space which may be the next succeeding one or the second or third succeeding tooth space, depending upon the proportions of the tooth and the requirements of the particular work.

In the prior patented construction, each tool travels in a plane with reference to the bottom of a tooth space, while in the present mechanism each tool travels in a concave path, with reference to the bottom of a tooth space, and owing to the fact that the cutting edge of the tool is inclined to its plane of travel, and the point of the tool travels in a concave path over the bottom of the tooth space, the tooth is of varying cross section from end to end, being thinner at the center and thicker at the ends, as more fully pointed out in my co-pending application relating to the pair of gears. Instead of correcting this variation in the form of the tooth, the present mechanism is designed to cut the other member of the pair, or pinion, so that it will be exactly complemental to the gear, and this is accomplished by the following construction.

In the cutter just described, the tools 2 extend radially and exteriorly from a disk-like support, and for cutting the pinion I employ a cutter 20, see Figure 6, which is ring-like in form and has a series of tools 21 extending radially and interiorly therefrom. The cutter 20, see Figure 7, is mounted on a holder 22 which carries a gear 23 that is driven in the same manner as the gear 6 already described, the cutting and generating motions of the pinion cutter being the same as for the gear cutter. In the pinion machine, the cutter support and bracket 16 on which it is mounted are adjusted endwise of the bed or table, as seen in Figures 6 and 9, to bring the tool into proper relation to the pinion.

In the case of the pinion, each tool travels in a convex path over the bottom of the tooth space, producing a tooth that is non-uniform from end to end, but complemental in shape to the tooth produced on the gear, so that the two members of the pair mesh properly when run together, and require no correction. To secure accurate results, both cutters for the gear and pinion are constructed with the same pitch circle. The pinion 24 is hobbed in the same manner as the gear, the cutter 20 and pinion 24 being rotated continuously during the cutting operation, and thus producing a lengthwise curved tooth which is thicker at its central portion and thinner at the end portions, and is complemental to the tooth on the gear.

One machine is used for cutting one member of the pair and another machine for cutting the other member of the pair, the only substantial difference between the two mechanisms being in the form of the cutters, one having interiorly extending tools and the other having exteriorly extending tools. In each case, the shaft 14 is driven from the pulley shaft 112 in the manner described in the before mentioned patent. The pulley shaft 112 derives its rotation from the pulley 113 which may be actuated from any suitable source of power.

In each case, the blank is rotated continuously on its axis by the gearing described in said patent, the blank spindle 127 being provided with a worm wheel 128 which is driven by a worm (not shown) secured to the worm shaft 130. Secured to the worm shaft 130 is a bevel pinion 131 which is driven by the bevel pinion 132 secured to the shaft 133. The latter shaft carries a bevel gear 134 which is driven from the shaft 135 by the bevel gear 30. The shaft 135 is driven from the shaft 142 in the manner described in the patent referred to.

The shaft 142 carries a spur gear 143 which is driven by a spur gear 144 mounted on a stub shaft which also carries a spur gear 145. The latter meshes with a gear 146 on the shaft 147 which is driven from the shaft 148 through the bevel gears 149 and 150. The shaft 148 carries on its outer end a spur gear 151 which meshes with a spur gear 152 mounted on the reversible shaft 154, which is controlled by the reversing mechanism described in the before mentioned patent. The shaft 154 is driven from the shaft 155, either through the pinion 191 or the pinion 193, as described in said patent.

The shaft 155 carries a spur gear 156 which is operated through the idler gear 157 by the gear 158 mounted on the main shaft 159. The shaft 159 is provided at one end with a gear 160 which is engaged by a gear 161 on stub shaft 162. The latter carries a bevel pinion 163 engaged by a corresponding pinion on the drive shaft 112, whereby the blank is continuously rotated.

The generating movement of the tool head support or cradle is effected from the shaft 148 by the bevel gearing, worm, and worm wheel segment, exactly as described in the before mentioned patent.

To maintain the timed relation between the tool and blank rotation, a compensating mechanism or similar device must be employed to compensate for the movement of the cradle 17. For this purpose, the shaft 155 carries a bevel pinion 169 which drives the shaft 170 through the pinion 171. The shaft 170 in turn drives the spindle 172 by means of a bevel pinion which meshes with the bevel pinion 174. Mounted on the spindle 172 is a gear 175 which meshes with an idler 176 which latter engages the gear wheel 177 fixed on the sleeve of a set of differential gears, through which, as described in said patent, a compensating motion is imparted to the blank spindle to maintain the timed relation between tool and blank.

In describing the machine of the present application, I have, in most instances, designated parts similar to those of the machine of the patent by reference numerals similar to those employed in the patent, simply raising these reference numerals by a 100.

The invention may be used in connection with straight teeth, in which case there is no hobbing or continuous cutting operation, but each tooth is completed and the blank indexed before cutting the next tooth.

The improvements are also applicable to generated or non-generated gears, or to a gear pair where only one member is generated, the other member being cut without any generating movement. Where the tools are arranged on the cutter-head in pairs, which successively travel through different tooth spaces, the two tools of each pair are spaced laterally so as to engage adjacent faces of a single tooth space as the pair passes therethrough, and the mating gear is then cut one face at a time to match the faces of the first gear.

The tools on the cutter are preferably arranged to cut first on one side of a tooth and then on the opposite side of another tooth, and they may be spaced so as to operate on every tooth or every second or third tooth as desired, such spacing being determined by the proportions of the teeth.

While I have described the invention with reference to a particular embodiment, it is not confined to the construction herein disclosed, and this application is intended to cover any modifications or departures contemplating the intent of the invention as set forth in the preceding description, or coming within the scope of the following claims.

I claim:

1. The method of forming a pair of gears which consists in cutting one member of the pair with a circular milling cutter having tools extending radially and exteriorly thereof and cutting the other member of the pair with a circular ring-like milling cutter having a series of tools extending radially and interiorly thereof.

2. The method of hobbing a pair of gears, which consists in cutting one member of the pair by rotating a blank continuously in intermeshing engagement with a continuously rotating circular milling cutter having a series of tools which successively engage different teeth and extend radially and exteriorly of the cutter, and cutting the other member of the pair by rotating a blank continuously in intermeshing engagement with a continuously rotating ring-like milling cutter having a series of tools which successively engage different teeth and extend radially and interiorly thereof.

3. The method of producing tapered gears which consists in rotating a cutter, having its cutting edges extending radially of its axis of rotation, in continuous intermeshing engagement with a continuously rotating gear blank, while maintaining the axis of the cutter at a predetermined distance from the apex of the blank so that the cutter will sweep out a tooth space on the blank which has a curved bottom.

4. The method of producing tapered gears which consists in rotating a cutter, having its cutting edges extending radially of its axis of rotation, in continuous intermeshing engagement with a continuously rotating gear blank, and imparting an additional relative movement between cutter and blank to generate the tooth profiles while maintaining the axis of the cutter at a predetermined distance from the apex of the blank so that the cutter will sweep out a tooth space on the blank which has a curved bottom.

5. The method of forming a pair of gears which consists in cutting both members of the pair with circular edge mill cutters having radially extending tools, the tools on one cutter extending in a direction opposite to the tools on the other cutter with reference to their respective centers of rotation.

6. The method of forming a pair of bevel gears which consists in cutting one member of the pair with a circular milling cutter having tools extending radially and exteriorly thereof, cutting the other member of the pair with a ring-like milling cutter having a series of tools extending radially and interiorly thereof, and imparting a relative generating motion between each cutter and the blank being cut thereby during the cutting operation.

7. The method of forming a pair of bevel gears by hobbing, which consists in cutting one member of the pair by rotating a blank continuously in intermeshing timed relation with a continuously rotating cutter having a series of tools which successively engage different teeth and extend radially and exteriorly of the cutter, while imparting a relative generating motion between cutter and blank during the cutting operation, and cutting the other member of the pair by rotating a blank continuously in intermeshing timed relation with a continuously rotating ring-like cutter having a series of tools which successively engage different teeth and extend radially and interiorly thereof, while imparting a relative generating motion between cutter and blank during a cutting operation.

8. The method of producing a pair of gears, which consists in cutting one member of the pair by rotating a blank continuously in intermeshing timed relation with a cutter, having its cutting blades extending radially and exteriorly thereof, and in cutting the other member of the pair by rotating a blank continuously in intermeshing timed relation with a ring-like cutter having its cutting blades extending radially and interiorly thereof.

9. The method of producing a pair of gears, which consists in cutting one member of the pair by rotating a blank continuously in intermeshing timed relation with a cutter, having its cutting blades extending radially and exteriorly thereof, while imparting an additional relative movement between cutter and blank to generate the tooth profiles, and in cutting the other member of the pair by rotating a blank continuously in intermeshing timed relation with a ring-like cutter, having its cutting blades extending radially and interiorly thereof, while imparting an additional relative movement between cutter and blank to generate the tooth profiles.

10. The method of forming a pair of bevel gears which consists in cutting two members of a pair with two rotary edge mill cutters having radially extending tools, the tools on one cutter extending in a direction opposite to the tools on the other cutter with reference to their respective centers of rotation, and imparting a relative generating motion between each cutter and the blank being cut thereby during the cutting operation.

11. In a machine for cutting gears, a blank support, a cutter support, a ring-like cutter, having tools extending radially and interiorly thereof, rotatably mounted on said cutter support and means for rotating said cutter in engagement with the blank to sweep out a tooth space on the blank which has a concave bottom.

12. In a machine for cutting gears, a blank support, a cutter support, a ring-like cutter, having tools extending radially and interiorly thereof, rotatably mounted on said cutter support, means for rotating said cutter in engagement with the blank and means for simultaneously imparting a relative generating movement between said cutter and blank.

13. In a machine for cutting gears, a blank support, a cutter support, a ring-like cutter, having tools extending radially and interiorly thereof, rotatably mounted on said cutter support, means for rotating said cutter in engagement with the blank and means for simultaneously imparting a continuous rotary movement to the blank.

14. In a machine for cutting gears, a blank support, a cutter support, a ring-like cutter, having tools extending radially and interiorly thereof, rotatably mounted on said cutter support, means for rotating said cutter in continuous engagement with the blank, means for rotating the blank continuously on its axis and means for imparting a relative generating movement between the cutter and blank.

15. In a machine for producing tapered gears, the combination with a blank carrier, of a rotary cutter, having its cutting portions radially arranged with reference to its axis of rotation, and means for rotating the cutter and blank in continuous intermeshing engagement, while maintaining the axis of the cutter at a predetermined distance from the apex of the blank.

16. In a machine for producing tapered gears, the combination with a blank carrier, of a rotary cutter, having its cutting portions radially arranged with reference to its axis of rotation, means for rotating the cutter and blank in continuous intermeshing engagement while maintaining the axis of the cutter at a predetermined distance from the apex of the blank, and means for simultaneously imparting an additional relative movement between the cutter and blank to generate the tooth profiles.

In witness whereof, I have hereunto signed my name.

ERNEST C. HEAD.